DEVICE FOR SECURING A MAGNETIC TAPE REEL

Filed May 12, 1969 2 Sheets-Sheet 1

INVENTOR.
JACK M. WAGNER
BY
SOKOLSKI & WOHLGEMUTH
ATTORNEYS

INVENTOR.
JACK M. WAGNER
BY
SOKOLSKI & WOHLGEMUTH
ATTORNEYS

United States Patent Office 3,606,188
Patented Sept. 20, 1971

3,606,188
DEVICE FOR SECURING A MAGNETIC TAPE REEL
Jack M. Wagner, Arcadia, Calif., assignor to Data Devices, Inc.
Filed May 12, 1969, Ser. No. 823,687
Int. Cl. B65h 17/02, 75/02
U.S. Cl. 242—68.3 2 Claims

ABSTRACT OF THE DISCLOSURE

A device for securing and driving reels of magnetic tape to devices on which they are used, comprising a rim having an elastomeric compressible layer about its outer periphery and a movable hub element which compresses and expands the elastomeric material to secure a tape reel thereon, further including a plurality of projectable finger elements which extend radially outward, covering a reel prior to the compression and expansion of the elastomeric element.

With the advent of the computer age, the ability to readily mount and dismount reels of magnetic tape from computers and other associated tape transport apparatus has become important. Not only is the ease of mounting the reel of significance, but further it is quite important that the reel be mounted in an exact flush position on the spindle to which it is secured. Any angular disposition of the reel would permit the off-going or on-coming tape to become twisted or distorted as it traverses through the tape heads and other portions of the device on which it is used.

In order to facilitate the ease of mounting and dismounting tape reels, quick release hub elements have been developed where once the reel is placed on its shaft or axle, it can be secured thereto by a hub that merely snaps and concurrently locks onto the shaft overlaying the reel. One means for securing the reel utilizing a quick release type hub is to provide a band of elastomeric material on the outer periphery of the rim on which the reel is mounted, whereby the elastomeric material is in contact with the bore of the reel. When locked in place the hub compresses the elastomeric material between it and the rim such that the elastomeric material tends to expand radially outward against the bore of the reel, locking the reel relative to the axle or shaft of the tape transport device. However, even in such an arrangement, a problem will arise if the reel is not flush-mounted on the rim containing the elastomeric material. As can be readily appreciated, expansion of the elastomeric material merely serves to lock the reel relative to the rotatable shaft of the device but does not serve to align the reel properly. Thus, even with the most recently developed type of hub configuration, alignment of the reel is still a problem that has not been heretofore successfully alleviated.

Thus, an object of this invention is to provide a novel hub for tape transport mechanisms which assures alignment of the tape reel as well as securing it to the device.

The above object is accomplished by the device of this invention which utilizes a principle of a compressible elastomeric band which expands outwardly against a tape reel to secure it to the hub. The elastomeric band is seated on a rim element which is rigidly affixed to the rotatable shaft of the tape transport mechanism such that the outer diameter of the elastomeric band essentially corresponds to the inner diameter of the tape reel. A separate hub cap element is actuated by a lever and moves inwardly against the elastomeric material when the lever is depressed, distorting the elastomeric material and forcing it to expand radially outward against the tape reel, thus securing the reel relative to the axle. This portion of the herein device closely resembles prior art structure. However, the device of the invention is further provided with a cam element seated concentrically within the device and slidably movable along the axle of the tape transport mechanism. When the lever of the device of the invention is depressed, the cam element is actuated such that it forces finger elements, provided radially outwardly through apertures, to extend beyond the outer periphery of the device and overlap the mounted reel. Continued depression of the lever causes inward movement of the hub cap toward the rim compressing the elastomeric band. The plurality of finger elements thus serve to indicate alignment of the reel on the device and prevent the reel from becoming misaligned since it cannot move in any direction laterally relative to the rotatable shaft of the transport device. Thus, if for example the fingers are not all exposed overlaying the tape reel when the lever of the hub is depressed, it becomes readily apparent that the reel is improperly aligned. Alternatively, if all the fingers do appear, then one is assured that the reel will not eventually be subjected to any misalignment. After the finger elements are projected, the continued depression of the lever further moves the cam and forces the fingers against the surface of the reel, causing the reel to seat properly. It is believed the invention will be further understood from the following detailed description and drawings in which:

Figure 2:
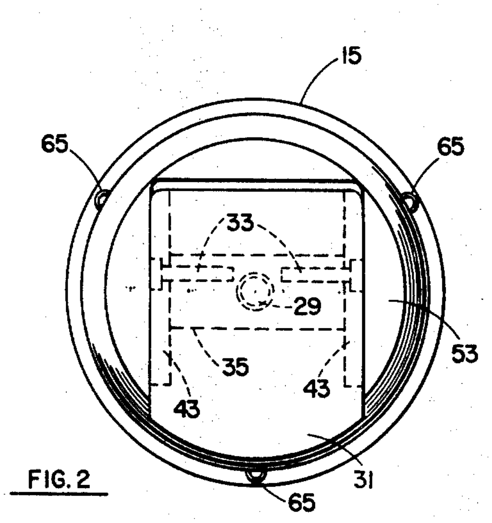
FIG. 2 is a front view of the device of the invention taken along lines 2—2 of FIG. 1.
Figure 1:
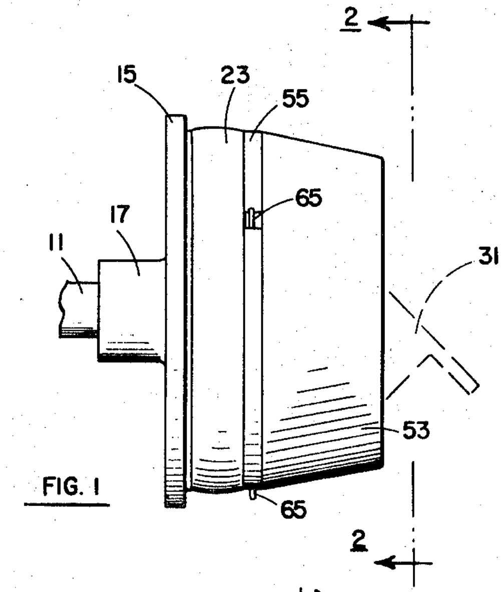
FIG. 1 is a side pictorial representation of the device of this invention.

Turning now to FIGS. 1–4, there is seen a first embodiment of the herein invention. As shown, an axle of shaft 11 of a tape transport machine is provided. As seen, the device of the herein invention comprises a rearward hub element 15 having an inward neck portion 17 which is affixed by set screw 19 or the like to portion 11 of the axle or shaft of the tape transport device. Mounted on an outer concentric shoulder portion 21 of the hub element 15 is an elastomeric band 23 of rubber or similar material. As can be seen, the elastomeric band 23 is disposed somewhat inwardly from the outer periphery 25 of the hub element 15 such that a backstop portion 27 thus results, against which the back of the tape reel can be seated. Mounted on the extreme outer threaded end 29 of the reduced portion 13 of the tape transport axle is a lever element 31. Lever element 31 is secured by pins 33 as particularly seen in dotted outline form in FIG. 2, to a pivot block 35. Pivot block 35 in turn is in threaded engagement with shaft portion 29 and can be fixedly secured thereto when desired by means of a set screw 37. Thus, as can be seen, lever element 31 can be turned about the shaft portion 29, moving inwardly or outwardly relative to the hub element 15 and secured in a fixed position when desired by depressing set screw 37 against the shaft portion 29.

Additionally mounted on the reduced portion 13 of the shaft adjacent and inwardly from lever element 31 is a circular cam 39. The cam element 39 is provided with a flat circular surface 41 against which the side walls 43 of the lever bear. The cam element 39 has a main body portion 45 integrally formed with the flat flange or lip 41. Body 45 has formed at the inner most end thereof an inwardly tapered surface 47 which in turn terminates in a flat surface 49 of lesser diameter than the main body portion 45. Tapered portion 47, as will be later explained, serves as camming means in the operation of the herein device.

Initially disposed between the cam element 39 and the hub element 15 is a hub cap 53. The hub cap 53 is provided with a rearwardly extending protrusion 55 which engages elastomeric material 23. The hub 53 is slidably mounted on the main body portion 45 of the cam element 39. Disposed rearward of the hub 53 and formed concentrically within the hub element 15 is a guide member 57 which is rigidly affixed by screws 59 or the like to the hub cap 53. As can be seen, the outer periphery 61 of the guide member 57 rides in sliding engagement with the inner diameter of the shoulder portion 21 of the rim 15. This thus serves to stabilize the movement of the hub cap 53 relative to the hub 15 and elastomeric material 23. The guide member 57 serves another important purpose in the herein invention in that is serves as means for containing a coil spring 63 between it and the cam element. The spring 63 serves as a return spring to return the cam element, as will be explained, to initial starting position when pressure is released on the device.

The assembly of the invention as seen in FIGS. 1–4 is further provided with three fingers 65 which radially extend outward between the hub cap 53 and guide member 57 in suitable apertures provided therein. The shape and configuration of the fingers are particularly well seen in FIGS. 5 and 6. In the initial position prior to depression of lever element 31, the fingers 65 as seen rest on flat surface 49 of the cam element. In such a position the outer ends of thhe fingers are contiguous with the outer periphery of the hub cap 53 and allow a tape reel to be easily slipped thereover onto the elastomeric material 23. Though the fingers as shown are formed of spring steel wire, they can obviously be of many shapes and configurations including flat spring metal strips and the like. Further, the number of fingers is not of great importance. Preferably, there should at least be three fingers equidistantly disposed as shown, in order to assure successful operation of the device.

DESCRIPTION OF THE OPERATION OF THE DEVICE OF THE INVENTION

Figures 3, 4:
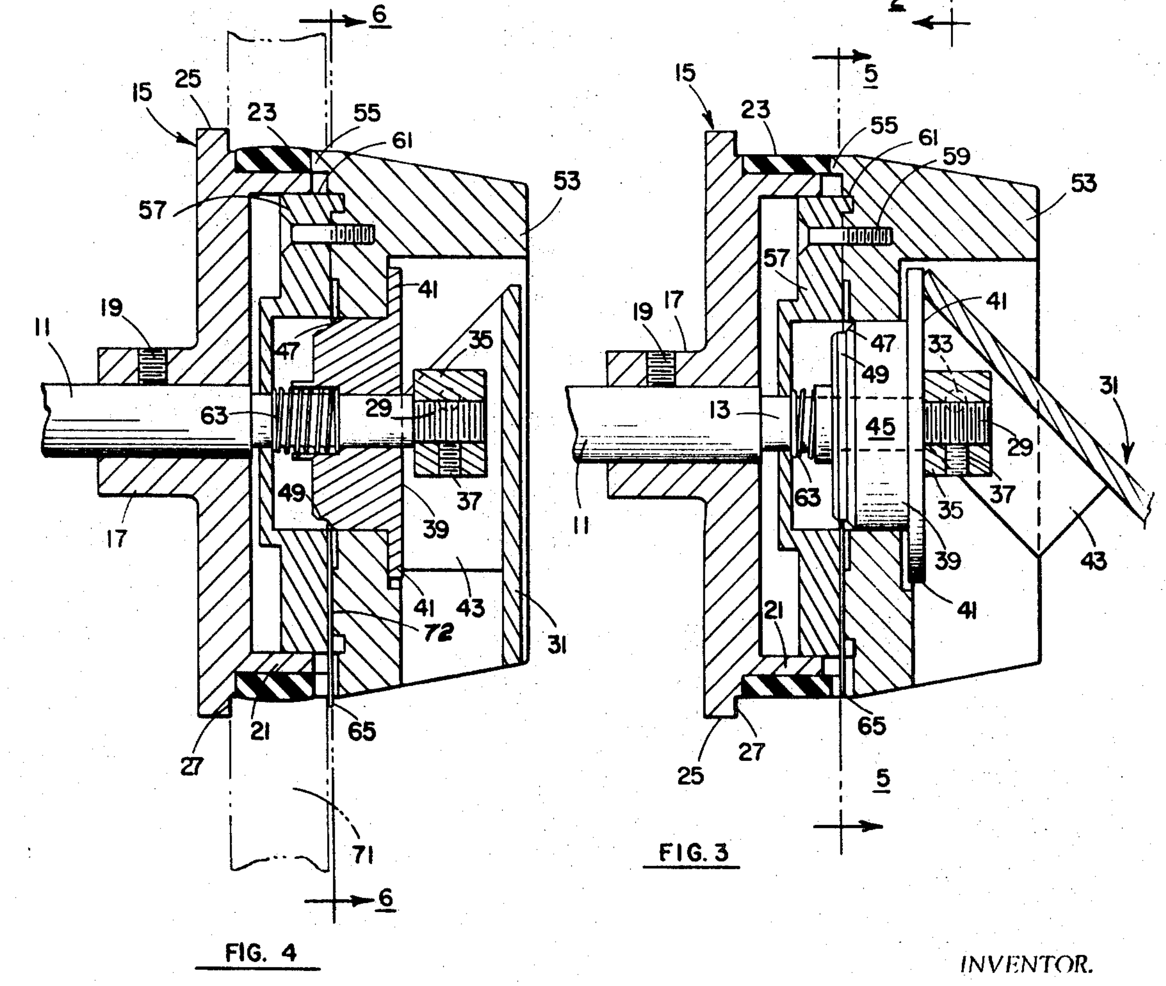
FIG. 3 is a partially sectioned view of an embodiment of the device of the invention in an open position.
FIG. 4 is a sectional view of the device of FIG. 3 in a closed position wherein the reel is locked thereon.

To explain the operation of the device, attention is initially directed to FIG. 3 where it is seen that the lever 31 is in an open position, tilted outwardly toward the user. The lever is initially rotated on shaft portion 29 forcing the surface 41 of the cam against the adjacent hub cap 53 in an inward direction. This in turn of course forces protrusion 55 against the elastomeric material 23. When contact is had between the protrusion 55 and the elastomeric material 23, set screw 37 is tightened; thus, rigidly securing the lever 31 relative to the shaft 29 as well as positioning the remaining elements of the device in a position as seen in FIG. 3. In this starting position, finger 65 is initially resting on the flat portion 49 of the cam element and is coextensive with the outer periphery of the hub cap 53.

When the lever 31 is pressed inward to a position shown in FIG. 4, its side 43 pushes against the cam element 39 forcing it inwardly. As the cam 39 moves in such an inward direction, the finger 65 is forced upward onto the slanted portion 47 of the cam, forcing it to extend radially outward to a position as shown in FIG. 4 wherein it will overlap a reel 71 shown in dotted outline disposed on the device. Additionally, when the cam element 39 is so moved, flange position 41 further bears upon the adjacent hub cap 53 and forces protrusion 55 to compress the elastomeric material 23 to the degree that it bulges slightly, as seen in FIG. 4, thus tightly holding the reel in place in a sealed relationship. Thus, the fingers 65 move from a position shown in FIG. 5 to that seen in FIG. 6, simultaneously with a bulging of the elastomeric material 23 locking the reel in place. If the reel is not flush against the back portion 27 of the hub 15, as is required, fingers 65 will not be fully exposed in front of the reel when lever 31 is depressed. As can be seen from the construction of the fingers 65, if one or all of the apertures are blocked by the reel the fingers 65 can spread apart when the cam is pushed forward in a closed position, to take up the increased diameter of the cam without moving outwardly due to the blockage of the reel. If the fingers 65 were thus not constructed of a spring material, the blockage and outward movement thereof would prevent the lever from being closed.

Actually, in the operation of the device of the invention the finger elements 65 move outwardly slightly before the compaction of the elastomeric material 23. Full compaction of the material 23 is not had until the lever 31 is completely closed, as seen in FIG. 4. However, the slanted cam surface 47 is so spaced that the fingers 65 move outwardly before the lever 31 is fully depressed. As can be readily seen, a slight movement inward or depression of lever 31 causes the fingers 65 to immediately begin to move upward and outward on surface 47. This outward movement of the fingers all occurs before lever 31 is fully depressed. Thus the first thing that occurs upon depression of lever 31 is the outer movement of the fingers 65 overlapping the reel 71. Sequentially this is then followed by the bulging of the elastomeric material 23 as seen in FIG. 4, particularly when the lever is in a fully depressed position. Before lever 31 is depressed, the reel 71 is in a loose fitting relationship on the elastomeric material 23. When the fingers 65 protrude they serve to align the reel prior to it becoming tight fitted due to the expansion of the elastomeric surface.

After the fingers 65 are fully projected due to the movement of the cam and before the lever is fully depressed, they are forced in a rearward direction toward back portion 27 of the hub 15. This is effected by surface 72 of the hub cap 53 bearing against the projected fingers as the hub cap is forced to compress or deform the elastomeric band 23. Thus, the fingers serve to push the reel into a flush seated position against the back 27 of the hub just prior to a complete compression of the elastomeric band when the lever is fully depressed.

If it is found that after depression of lever 31 to the position shown in FIG. 4 that the reel 71 is not tightly seated on the elastomeric material 23 then the lever is opened to position shown in FIG. 3, set screw 37 is loosened and the lever is rotated in a manner so that protrusion 55 will bear further inward upon the elastomeric material. In other words, the device can be adjusted so that the amount of bulging of the elastomeric material when the lever is closed can be controlled.

When the lever is reopened, to remove the reel, return spring 63 serves the important function of forcing the cam element 39 outwardly back into contact with the lever to the position shown in FIG. 3. Without such a return spring, of course, the cam would remain in the position of FIG. 4 even after the lever was opened.

Figures 5, 6, 7:
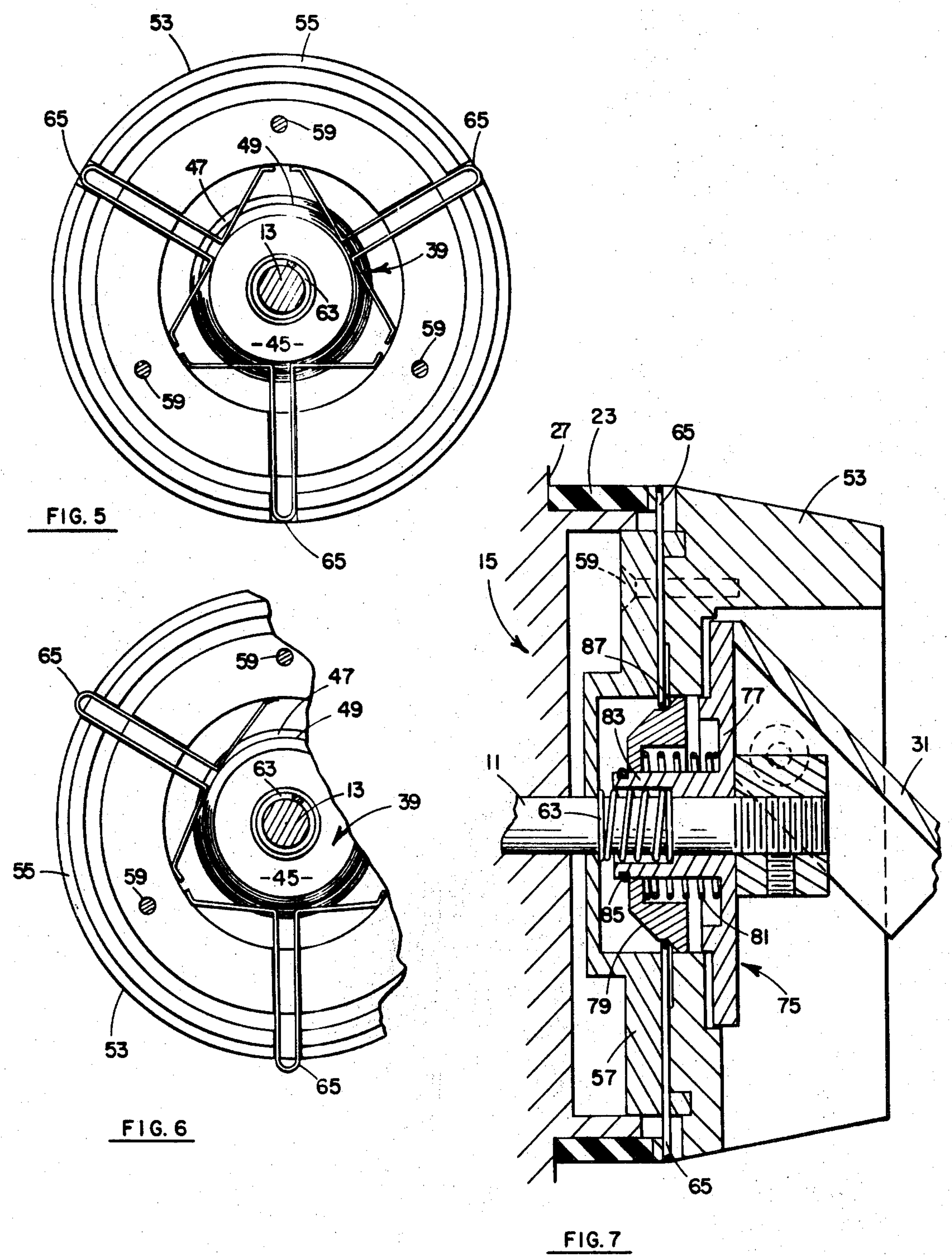
FIG. 5 is a view taken along lines 5—5 of FIG. 3, showing the radially extending finger elements of the device in a retracted position.
FIG. 6 is a partially sectioned view taken along lines 6—6 of FIG. 4, showing the finger elements in an extended position.
FIG. 7 is a sectional view of a second embodiment of the device of the herein invention.

Turning now to FIG. 7, there is seen an additional embodiment of this invention which utilizes essentially the same principle shown in FIGS. 1–4. The device in this embodiment utilizes the same lever 31, the same hub cap 53, and the same rim element 15. Further, the guide element 57 is identical to that seen in the previous embodiment, as well as the elastomeric material 23. The main difference in this device, however, concerns the cam operation for moving the spring fingers 65 outwardly when the lever 31 is depressed. In the herein embodiment, the cam operation is accomplished by two elements.

The first element is the cam head 75 which provides a flat flange portion 77 that contacts the lever 31 and the hub cap 53 when the lever is depressed. The second element comprises a cam nose 79 that is spatially disposed from the head element 75 by means of a coil spring 81 and thus can move independently from the cam head. The cam nose portion 79 thus slidably moves on elongated neck or sleeve portion 83 of the cam head 75. Neck portion 83 surrounds the shaft portion 13 of the tape transport mechanism.

Mounted on the end of neck portion 83 is a retaining ring 85 which serves to retain the cam nose portion 79 to prevent it from slipping off of the device. Thus, essentially in the herein embodiment the cam element has been broken up into two separate parts separated by the spring 81. The main reason for this configuration is to prevent a jamming of the spring fingers 65 if they are covered by a portion of the reel which has not been properly seated on elastomeric material 23.

In the operation of the device shown in FIG. 7, it can be seen that when the lever 31 is depressed, the cam head 77 moves in an inward direction toward the tape transport mechanism. The coil spring 81 separating the cam head portion 79 will force it to also move in the same direction. This action occurs before the cam head 77 portion contacts the hub cap 53 and causes compaction of the elastomeric material 23. As the cam head 79 thus moves inwardly, the fingers 65 are forced radially outwardly by the slanted cam surface 87 formed on the cam head. However, if resistance or blockage occurs, it can be seen that the movement of the cam head 79 will be stopped and the cam head portion 77 can continue independently in an inward direction. In other words, the force of the lever 31 against the cam head 77 will easily overcome resistance of the coil spring 81 allowing the lever to be depressed without forcing the cam head 79 to push the fingers 65 outward. It should be apparent that the embodiment of FIG. 7 thus allows the fingers 65 to be constructed of non-spring material, since they are not required to give or bend when encountering resistance at the outer periphery.

Though the invention has been described relative to the use of a deformable elastomeric band 23, other suitable means can be easily used to accomplish a locking of the reel to the hub. For example, an expandable split ring, which is forced to expand by a cam or other suitable means, will suffice to provide the same end result when used in combination with the herein invention.

It should be further apparent that the lever 31 is not the only means for forcing a movement of the cam and depression of the hub cap herein. A slidable knob could be utilized which, upon movement inwardly on the axle of the tape transport mechanism, would cause the same desired effect.

I claim:

1. A device for securing a tape reel to a shaft of a tape transport mechanism comprising:

a hub attachable to said shaft, said hub having an elastomeric band for expanding the diameter thereof for securing a tape reel thereto, a plurality of radial finger elements disposed adjacent one side of said elastomeric band, a cam element for slidable disposition on the shaft of said tape transport mechanism, wherein an inner end of said fingers are in contact with said cam, means secured to said shaft adjacent said cam element, said means bearing against said cam element whereby when said means is actuated said cam element slidably moves on said shaft toward said hub, forcing said finger radially outward, a slidable hub cap surrounding said cam, said hub cap being on a side of said elastomeric band, a separate element spatially disposed from said cam, said element having a radially extending projection whereby actuation of said means bearing on said cam forces said hub cap to move toward said hub compressing said elastomeric band, and a spring spatially separating said cam from said separate element.

2. The device of claim 1 wherein:

said separate element is provided with an integrally formed sleeve portion for surrounding the shaft of a tape transport mechanism, said cam element slidably mounted on and surrounding said sleeve portion with said spring further coiled about said sleeve portion extending from said radial projection of said element to said cam.

References Cited

UNITED STATES PATENTS 3,367,595 2/1968 Yokota ------------ 242—68.3

GEORGE F. MAUTZ, Primary Examiner